UNITED STATES PATENT OFFICE 2,591,675

ORGANOTIN COMPOUNDS AND COMPOSITIONS CONTAINING THE SAME

James M. Church, Tenafly, Ernest W. Johnson, Mountainside, and Hugh E. Ramsden, New Brunswick, N. J., assignors to Metal & Thermit Corporation, New York, N. Y., a corporation of New Jersey No Drawing. Application March 31, 1949, Serial No. 84,756

10 Claims. (Cl. 260—45.75)

This invention relates to new organotin compounds and to compositions incorporating the new compounds, such compositions being themselves new and useful and serving to illustrate one of the uses for the compounds.

The compounds may be represented generally by the empirical formula:

$$[(R_1R_2SnO)_x(OCR_3R_4)]_n$$

in which $x$ is a number varying between 1 and 6, $n$ is a small whole number such as 1, 2, 3, etc., $R_3$ and $R_4$ are selected from the class consisting of hydrogen and radicals now to be defined, and $R_1$, $R_2$, $R_3$ and $R_4$ are radicals selected from the class consisting of alkyl, alkenyl, aryl and heterocyclic radicals. As will be apparent, the ratio of the portion $R_1R_2SnO$ to the portion $OCR_3R_4$ is never less than one, although it may be greater than one.

It will be seen that the compounds covered by the above formula may be either monomeric or polymeric. Preferably they are polymeric and may range from crystalline to amorphous solids. They are prepared by reacting an organotin compound with a carbonyl-containing material selected from the class consisting of aldehydes and ketones. The organotin compound may be a dialkyl tin oxide in which the alkyl group may be methyl, ethyl, propyl, butyl, isobutyl, amyl, isoamyl, hexyl, octyl, lauryl, etc., and in which both alkyl groups of each particular tin oxide may be the same or different. Alkyl groups having between three and about 16 carbon atoms are preferred. The alkyl groups may be cyclic, such as cyclohexyl, and may have as substituents ester, carboxyl, halogen and equivalent radicals. Diaryl tin oxides and diaralkyl tin oxides are also useful for the reaction, the diaryl and diaralkyl groups in each such oxide being the same or different and including such aryl groups as phenyl, tolyl, xylyl, naphthyl, etc., and such aralkyl groups as benzyl, phenethyl, etc. In addition, the aryl and aralkyl groups may be substituted by ester, carboxyl, halogen, alkoxy and other equivalent groups. Dialkenyl tin oxides, such as diallyl tin oxide, dicrotyl tin oxide, dipentenyl tin oxide, dicinnamyl tin oxide, etc. may serve as the organotin oxide. The organo groups of the latter may also be heterocyclic radicals such as furyl, thienyl, thenyl, pyridyl, etc. As will be apparent, the organo groups of all of the foregoing tin oxides will furnish the $R_1$ and $R_2$ radicals in the general formula written above.

Suitable aldehydes for the reaction include aliphatic aldehydes like formaldehyde, acetaldehyde, propionaldehyde, butyraldehyde, crotonaldehyde, valeraldehyde, caprylaldehyde, 2-ethylhexanal, etc.; aromatic aldehydes like benzaldehyde, and aralkyl aldehydes like phenylacetaldehyde, etc.; and heterocyclic aldehydes like furfural. The ketones comprise aliphatic, aromatic, and heterocyclic ketones such as acetone, methyl ethyl ketone, acetophenone, cyclohexanone, acetylfurane, acetylnaphthalene, etc. It is preferred to employ an aldehyde or a ketone having a boiling point of at least 60° C. The value of the $R_3$ and $R_4$ radicals in the general formula will depend on the particular aldehyde or ketone used in the reaction. For example, if the aldehyde is formaldehyde, both $R_3$ and $R_4$ will be hydrogen radicals; if it is acetaldehyde, $R_3$ will be hydrogen and $R_4$ will be methyl; if it is 2-ethylhexanal, $R_3$ will be hydrogen and $R_4$ will be (1-ethylpentyl); if a ketone like acetone is used, both $R_3$ and $R_4$ will be methyl; if the ketone is acetophenone, $R_3$ or $R_4$ will be methyl and the other will be phenyl. Cyclohexanone is an exception to the general formula but is useful in the reaction.

The reaction may be carried out by simply bringing the organotin oxide and the aldehyde or ketone together in any suitable proportions. For practical reasons, a large excess of one reactant is to be avoided. In general, concentrations in which the organotin oxide may vary from ¼ to 1 mol per mol of aldehyde or ketone are satisfactory. The reaction is preferably carried out at elevated temperatures ranging from about 50 to about 200° C., and, desirably, at the boiling point of the aldehyde or ketone within this range. If a solvent for the reaction is employed, as is useful, it is advantageous to run the reaction at the boiling point of the solvent. Solvents like toluene, carbon tetrachloride, ether, hexane, heptane, etc. are suitable. Usually the solvent will dissolve the aldehyde or ketone, and the heated solvent will dissolve the reaction product, while the organotin oxide, which is generally a solid, frequently remains undissolved. As the oxide reacts, however, it gradually disappears. The use of a solvent serves to keep the reactants stirred and also enables the course of the reaction to be followed more conveniently by the amount of oxide which is visible at any time. The reaction may also proceed below 50° C., and at room temperatures, although at a reduced rate. At elevated temperatures, the reaction may require at least one or two hours, and more generally 6 to 12 or more hours for substantial completion. The pressure during the reaction is atmospheric, but it is possible to carry it out under higher pressures.

Although the reaction product is generally soluble in the hot solvent, on cooling, it may be precipitated out and recovered.

The examples which follow may illustrate the preparation of various reaction products.

Example 1

One mol (248.7 grams) of dibutyl tin oxide is heated under reflux with 1 mol (128 grams) of 2-ethylhexanal in sufficient toluene to allow efficient stirring. After a period of several hours most of the dibutyl tin oxide is consumed in the reaction. The solution is filtered hot to remove unconverted oxide, and on cooling, crystals are deposited. Evaporation of the mother liquor yields a second crop of crystals which are different from the first crop in tin percentage, 30.9% tin as against 44.0% for the first crop.

Example 2

One mol (248.7 grams) of dibutyl tin oxide is heated under reflux with 4 mols of 2-ethylhexanal in toluene until the reaction is complete. Subsequent treatment is the same as in Example 1. An increase in the yield of the second product of 30.9% tin is obtained as against a decrease of the yield of the first product of 44% tin.

Example 3

One mol (248.7 grams) of dibutyl tin oxide is refluxed with 4 mols (392 grams) of cyclohexanone in toluene until the reaction is complete. The solution is filtered hot, and on cooling the filtrate, a tin-containing crystalline product soluble in hot toluene results.

Example 4

One mol (288.7 grams) of diphenyl tin oxide is refluxed with 4 mols (288 grams) of butyraldehyde in toluene until the oxide disappears. Excess butyraldehyde is distilled out and the solution is filtered hot. Toluene is removed by distillation and the product is left as a solid.

The compounds prepared as above described have been found to be useful as stabilizers for organic materials containing chlorine or other halogen, such as vinyl resins containing polymerized vinyl chloride, chlorinated paraffins containing from 10 to 40 carbon atoms per molecule, chlorinated stearates, chlorinated biphenyls, dichlorodiphenyltrichloroethane (DDT), chlorinated rubber, and other preferably high molecular weight halogenated material. As is known, such material has a tendency to deteriorate, especially during heating, and is thus rendered unfit for service. Usually the deterioration is manifested by a widespread discoloration of the material. The compounds produced as described are effective for inhibiting the deterioration and discoloration of the foregoing halogenated materials. By adding from about 0.1 to about 10% of such compounds to the material to be stabilized, a composition is obtained which is greatly improved in stability by comparison with the unstabilized material. Compounds of lower tin content are particularly effective as stabilizers. The following examples may illustrate the preparation of such compositions.

Example 5

On a weight basis, 98 parts of polyvinyl chloride was stirred into a mixture of 60 parts butyl benzyl phthalate and 10 parts of tricresyl phosphate as plasticizers, and 2 parts of the product of Example 1 having 30.9% tin, until a homogeneous dispersion was secured. Similarly, a second or control dispersion was prepared containing no organotin compound. A third composition containing 2 parts of dibutyl tin maleate as the tin compound was also prepared. Samples of these compositions were placed in the cavities of molds, the cavities being in the shape of strips 1" by 6" by 0.05". The molds were then placed in an oven at 185° C., the temperatures of the molds being gauged by thermocouples placed in borings in the molds. In one series of tests the molded strips were withdrawn from the oven when their temperatures reached 185° C. The control composition was deep red in color, that containing dibutyl tin maleate was light yellow, and that containing the product from Example 1 was colorless. A second series of tests was carried out in which the molds were allowed to remain at 185° C. for 30 minutes. In this series the control was very dark reddish in color, the molded strip containing dibutyl tin maleate was light tan, and the strip with the product from Example 1 was colorless. A third series of tests was carried out at 195° C. for 45 minutes, and in this case the control strip was nearly black, the strip containing the maleate was dark orange with reddish streaks, while the strip containing the product from Example 1 was yellowish.

Example 6

A composition was prepared containing 95 parts by weight of a polyvinyl resin consisting of 85% vinyl chloride and 15% vinyl acetate, 47.5 parts by weight of dioctyl phthalate as the plasticizer, and 5 parts of the tin product from Example 4. The above mixture was compounded on a differential speed roll mill at 160–165° C. for 5 minutes and removed as sheeting. A control composition was made in the same way with the exception that no organotin compound was used. A third composition containing dibutyl tin maleate was prepared in the same way.

Uniform strips were prepared from samples of these three compositions by molding at a pressure of 2000 p. s. i. between the platens of a hot press utilizing molds which formed strips 6" by 1" by 0.05". The molds were heated at a temperature of 180° C. for a period of 30 minutes in order to determine discoloration in the strips. The control composition yielded a strip which was badly discolored, being a deep reddish. The composition containing dibutyl tin maleate was yellow to tan, while the composition containing the compound from Example 4 was colorless.

Although the invention has been described in connection with selected embodiments thereof, it will be appreciated that it is capable of obvious variations without departing from its scope.

In the light of the foregoing description, the following is claimed:

1. An organotin compound having the formula $(R_1R_2SnO)_x(OCR_3R_4)$, in which $R_1$, $R_2$, $R_3$ and $R_4$ are radicals selected from the class consisting of alkyl, alkenyl, aryl, and heterocyclic radicals, and $x$ is a number varying between 1 and 6.

2. An organotin compound having the formula $(R_1R_2SnO)_x(OCR_3R_4)$, in which $R_3$ and $R_4$ are aryl radicals, $R_1$ and $R_2$ are alkyl radicals, and $x$ is a number varying from 1 to 6.

3. An organotin compound having the formula $(R_1R_2SnO)_x(OCR_3R_4)$, in which $R_3$ and $R_4$ are aryl radicals, $R_1$ and $R_2$ are aryl radicals, and $x$ is a number varying from 1 to 6.

4. An organotin compound having the formula $(R_1R_2SnO)_x(OCR_3R_4)$, in which $R_1$, $R_2$, $R_3$ and $R_4$ are alkyl radicals, and $x$ is a number varying from 1 to 6.

5. An organotin compound having the formula $(R_1R_2SnO)_x(OCR_3R_4)$, in which $R_3$ and $R_4$ are alkyl radicals, $R_1$ and $R_2$ are aryl radicals, and $x$ is a number varying from 1 to 6.

6. An organic, halogen-containing material having incorporated therein from about 0.1 to about 10% by weight of the compound of claim 1.

7. An organic, halogen-containing material having incorporated therein from about 0.1 to about 10% by weight of the compound of claim 4.

8. A stabilized chlorine-containing resinous composition incorporating about 0.1 to about 10% by weight of the compound of claim 1.

9. A stabilized plasticized, vinyl resin composition comprising polymerized vinyl halide, said resin having incorporated therein from about 0.1 to about 10% by weight of the compound of claim 1.

10. A stabilized composition comprising a chlorinated paraffin having from 10 to 40 carbon atoms per molecule and the compound of claim 1.

JAMES M. CHURCH.
ERNEST W. JOHNSON.
HUGH E. RAMSDEN.

REFERENCES CITED

The following references are of record in the file of this patent:

UNITED STATES PATENTS

| Number | Name | Date |
|---|---|---|
| 2,219,463 | Yngve | Oct. 29, 1940 |
| 2,376,313 | Reiff | May 15, 1945 |